(12) United States Patent
Dupont et al.

(10) Patent No.: US 12,535,378 B2
(45) Date of Patent: Jan. 27, 2026

(54) FLUID CONSUMPTION METER AND LEAK DETECTION SYSTEM

(71) Applicant: Kamstrup A/S, Skanderborg (DK)

(72) Inventors: Sune Hoveroust Dupont, Skanderborg (DK); Jens Lykke Sørensen, Skanderborg (DK); Søren Tønnes Nielsen, Skanderborg (DK); Anders Hedegaard, Skanderborg (DK)

(73) Assignee: KAMSTRUP A/S, Skanderborg (DK)

( * ) Notice: Subject to any disclaimer, the term of this patent is extended or adjusted under 35 U.S.C. 154(b) by 525 days.

(21) Appl. No.: 17/779,455

(22) PCT Filed: Nov. 26, 2020

(86) PCT No.: PCT/EP2020/083541
§ 371 (c)(1),
(2) Date: May 24, 2022

(87) PCT Pub. No.: WO2021/105301
PCT Pub. Date: Jun. 3, 2021

(65) Prior Publication Data
US 2023/0008984 A1    Jan. 12, 2023

(30) Foreign Application Priority Data
Nov. 26, 2019    (DK) .......................... PA 2019 70729

(51) Int. Cl.
*G01M 3/24*    (2006.01)
*G01F 25/10*    (2022.01)
(52) U.S. Cl.
CPC ............. *G01M 3/243* (2013.01); *G01F 25/10* (2022.01)

(58) Field of Classification Search
CPC .......... G01M 3/243; G01M 3/24; G01M 3/26; G01M 3/28; G01M 3/207; G01F 25/10
See application file for complete search history.

(56) References Cited

U.S. PATENT DOCUMENTS

| 2006/0254342 A1* | 11/2006 | Ito ..................... F02M 25/0809 |
| | | 73/49.2 |
| 2014/0121999 A1 | 5/2014 | Bracken et al. |
| 2018/0348081 A1* | 12/2018 | Levine .................. G01M 3/04 |
| 2020/0072661 A1* | 3/2020 | Forster-Knight ...... G01H 11/08 |

FOREIGN PATENT DOCUMENTS

| EP | 3236227 A2 | 10/2017 | |
| KR | 101382232 B1 * | 4/2014 | .............. F17D 5/06 |
| WO | 2017005687 A1 | 1/2017 | |
| WO | 2018068097 A1 | 4/2018 | |

* cited by examiner

*Primary Examiner* — Stephen D Meier
*Assistant Examiner* — Quang X Nguyen
(74) *Attorney, Agent, or Firm* — McGlew and Tuttle, P.C.

(57) ABSTRACT

A fluid consumption meter (50) configured to measure a flow rate of a fluid and with a noise detection module (40) for leak detection. Also having a control device with a bi-directional communication unit (60) and being configured to receive a leak detection control signal from an external device (100), to set the fluid consumption meter (50) into a leak detection mode upon reception of the leak detection control signal, and to start a noise measurement for leak detection in said leak detection mode and to transmit data from said noise detection module, an to a leak detection system.

25 Claims, 8 Drawing Sheets

FLUID CONSUMPTION METER AND LEAK DETECTION SYSTEM

CROSS REFERENCE TO RELATED APPLICATIONS

This application is a United States National Phase Application of International Application PCT/EP2020/083541, filed Nov. 26, 2020, and claims the benefit of priority under 35 U.S.C. § 119 of Danish Application PA 2019 70729, filed Nov. 26, 2019, the entire contents of which are incorporated herein by reference.

TECHNICAL FIELD

The present invention pertains to a fluid consumption meter comprising a noise detection module and to a leak detection system.

TECHNICAL BACKGROUND

Generally, the present invention relates to methods and systems for determining a present state of a pipe system or sub-system between a control valve and an acoustic sensor. The present invention relates to a detector and a detection method configured for determining a present state of a pipe system or a pipe sub-system between a control valve and said acoustic sensor.

The water loss in a utility water distribution system approaches fifty percent. This is not only a loss of a scarce natural resource itself. Distribution of water is also very energy consuming and thus by reducing water loss, energy consumption as a whole can be reduced. Today, determining the present state of the water distribution system or a sub-system or section thereof, such as to be able to identify leaks, is a cumbersome process requiring installation of additional equipment and a lot of manual work to be performed on the field. Determining a present state of a pipe system or sub-system may for example require multiple steps and access to the pipe system at the point of consumption and at the point of location of a district valve, supply line valve, connection valve, etc.

SUMMARY

It is an object of the invention to provide an improved fluid consumption meter and an improved leak detection system allowing a simplified and more precise leak detection in a pipe system. This object is achieved by a fluid consumption meter and by a leak detection system according to the invention. Preferred embodiments are disclosed, including in the following description and the accompanying drawings.

The fluid consumption meter according to the invention is configured to measure a flow rate of a fluid and to measure the fluid consumption on basis of this flow rate. Such fluid consumption meters are used in houses for example to measure the water consumption for billing purposes. The fluid consumption meter according to the invention additionally comprises a noise detection module configured to detect acoustic noise for leak detection. This may be done by a separate acoustic sensor, like for example a microphone. Alternatively, the measuring device detecting the flow rate may be used as an acoustic sensor. This is in particular preferred in case that the flow detection is done by an ultrasonic flow meter including at least one ultrasonic sensor which may be used for detecting acoustic noise in addition.

The noise detection module for leak detection may be used in a special operational mode, called leak detection mode in the following.

The control device comprises a bi-directional communication unit allowing to transfer data or signals from the outside to the control device and to transmit or send data from the control device to an external device. The control device is configured to receive a leak detection control signal from an external device via the communication unit. The leak detection control signal may initiate the start of a special operational mode of the flow consumption meter for leak detection, i.e. the leak detection mode. The control device, thus, is configured to set the fluid consumption meter into a leak detection mode upon reception of said leak detection control signal. To receive the leak detection control signal the communication unit may continuously listen for such a signal. Alternatively, the communication unit may regularly or irregularly send a request to an external device whether such a leak detection control signal is set in the external device. Furthermore, it may be possible that the communication unit switches into a listening mode for receiving a control signal in a certain period of time, for example always during nighttime or similar. Furthermore, the control device is configured to transmit data from said noise detection module via the communication unit if this is in said leak detection mode. This solution allows to switch the fluid consumption meter into a leak detection mode to get data concerning noise detected by the fluid consumption meter if desired. This allows an operator to just use one or more fluid consumption meters for leak detection when needed. If no leak detection is required the flow consumption meter preferably does not change into the leak detection mode to save energy.

The control device and the noise detection module preferably are configured such that a noise detection by said noise detection module is started in said leak detection mode, i.e. acoustic noise is recorded in said leak detection mode. This means, preferably the acoustic noise is currently recorded in said leak detection mode and the recorded data from said noise detection module are transmitted in the leak detection mode or at a different point in time in a different operational mode, for example in response to a special transmittal request. Alternatively, it may be possible that the noise detection is carried out in a different point in time, for example the leak detection mode may be started with a delay or at specified time defined in said leak detection control signal. According to a further possible embodiment the noise is recorded and stored and then transmitted later.

According to a further preferred embodiment the control device is configured such that in said leak detection mode the control device can be controlled by an external device via said communication unit. The external device can switch on the leak detection mode by sending the leak detection control signal, e.g. via Bluetooth. Furthermore, the control device may be controlled in different manner by the external device, for example to change between operational modes, to adjust parameters or to control further devices, as for example valves etc. Furthermore, it may be possible to control the control device to set up or change the data output or data transmission, for example to change a data standard or protocol used.

In a further possible embodiment the control device is configured to receive a leak detection control signal sent by a further fluid consumption meter or sensor device acting as an external device. For example, there may be a master fluid consumption meter which is able to activate other fluid consumption meters to change into their leak detection mode. Furthermore, it may be possible to start the leak detection with one fluid consumption meter and to further activate other fluid consumption meters to change into their leak detection mode, if desired, for example to more precisely identify a leak.

In a further preferred solution, the control device may be configured to send out a leak detection control signal being able to set an external device, for example a further fluid consumption meter or sensor device, into a leak detection mode as described before, i.e. an operational mode in which noise detection is carried out and/or data from such noise detection are transmitted. Such a fluid consumption meter may be used as a master fluid consumption meter and/or to activate other fluid consumption meters for leak detection, as described before.

The control device preferably is configured such that the fluid consumption meter is put into said leak detection mode upon receiving the leak detection control signal together with an address identifying said fluid consumption meter. The address may be unique for a special fluid consumption meter. This allows to exactly address a desired fluid consumption meter in a fluid supply network such that this identified fluid consumption meter can be put into said leak detection mode for making the noise detection. This allows to choose single fluid consumption meters for leak detection or noise detection in a complex fluid supply system, like a water supply system, comprising many fluid consumption meters.

The control device and/or the communication unit according to a further possible embodiment is configured such that the data transmitted in the leak detection mode comprise data based on noise recorded by said noise detection module and preferably comprise a time stamp. The time stamp specifies a point in time at which the noise detection was carried out. In particular in case that several sensors, like for example fluid consumption meters are used for noise detection to identify a leak in a pipe system, it may be important that the noise detection is carried out at the same time to allow a correlation between the data or signals detected by the different sensors. This allows to more precisely localize a leak in a complex pipe system or pipe sub-system. The time stamp may identify an absolute time value or a relative time value calculated from a predefined or agreed point in time.

The control device and/or the communication unit may be configured such that the data transmitted in the leak detection mode comprise real time data based on the noise currently recorded by said noise detection module. This allows a live measurement in a pipe system, in particular a live measurement using several sensors like for example several fluid consumption meters including noise detection modules, at the same time and then, preferably to carry out a correlation to identify a leak inside the pipe system. The correlation for example may be carried out like a triangulation.

In addition or alternatively the control device and the noise detection module may be configured such that data based on the noise recorded by said noise detection module are stored and that the stored data are transmitted later at a different point in time. This allows the flow consumption meter or a sensor to make the noise measurement at a suitable point in time, for example defined in said leak detection control signal, to store the information and to transmit the stored information if desired or requested by an external device, e.g. by sending a data transmittal control signal. For example, the control device may be configured such that it can start a noise detection at a preset point in time. The control device may receive information at which point in time to start a noise detection from an external device via said communication unit. Preferably, the recorded data are stored and transmitted together with a time stamp defining the point in time of recording.

According to a further possible embodiment the noise detection module and the control device may be configured such that a state noise measurement and baseline noise measurement are performed and that the measured data or data calculated on basis of these measurements are recorded and/or transmitted, preferably in said leak detection mode. The baseline noise measurement allows to reduce or eliminate baseline noise or signals during noise measurement.

The baseline noise measure may be a measure indicative of the acoustic profile of a pipe sub-system when seen in isolation or in-part in isolation. There may be one or more noise sources in fluid communication with the pipe sub-system or section for which the present state is to be determined. A control valve defining one end of the pipe sub-system to be assessed may be closed or adjusted to decouple the pipe sub-system from the remaining part of the utility or fluid distribution system in order to provide a baseline noise measure inside the sub-system. The baseline noise measure may be calibrated or otherwise optimized.

There is an act of determining the present state of the pipe sub-system or section as a function of a state noise measure and the baseline noise measure.

In another example, a control valve may be closed and a baseline noise measure may be established. The baseline noise measure may be provided from a repository or measured and transmitted. The control valve may then be opened and a state noise measure may be established. Alternatively, the state noise measure may be retrieved from historically store valued in the acoustic sensor or a back-end system like for example an external device or remote control. The present state of the pipe sub-system may be determined as a function of the baseline noise measure and the state noise measure.

According to a further possible embodiment said control device includes a communication unit configured such that different communication protocols and/or data types are selectable for the data to be transmitted. This allows the communication with different other external devices by adjusting the "language" used by the communication unit of the fluid consumption meter. The change of communication protocols and/or data types in the communication unit and/or said control device may be initiated by control from an external device, as described above and in the following.

According to a further preferred embodiment the fluid consumption meter comprises at least one battery for energy supply and said control device is configured such that it rejects a desired change into the leak detection mode and/or is configured such that it terminates the leak detection mode if the power consumption violates a desired lifetime of said battery. The energy supply of a fluid consumption meter by use of a battery is a very sensitive issue, since a long battery lifetime has to be ensured. Thus, a very strict energy management is required. The communication in the leak detection mode to transmit detected data and/or the noise measurement itself may result in an increased energy consumption which may effect the battery lifetime. To ensure a minimum lifetime it may be necessary to limit the use in noise detection mode. By prohibiting the use of the noise detection mode under certain circumstances, for example if this mode has been used several times before, a minimum lifetime of the battery can be guaranteed.

The lifetime of the battery may be calculated by a suitable algorithm inside the control device on basis of an actual measurement of battery characteristics. In a further embodiment which may be realized as an alternative or in addition said control device may comprise a counter and may be configured such that the counter tracks periods of increased power consumption in the leak detection mode. There may be a predefined maximum for the time with such an increased power consumption stored in the control device and the control device may be configured to prohibit or terminate the leak detection mode in case that the predefined maximum time is reached. Furthermore, it may be possible to just count how often the device has been changed into the leak detection mode and there may be a limit for the number of activations of the leak detection mode preset in the control device.

Furthermore, a leak detection system for leak detection in a fluid supply system or a pipe system or pipe sub-system, respectively is subject of the present invention. It is to be understood that preferred features of the fluid consumption meter described above should be regarded as preferred embodiments of the leak detection system, too. Furthermore, preferred features of the leak detection system described in the following can be regarded as preferred embodiments of the fluid consumption meter, too.

The leak detection system according to the invention can be used in a fluid supply system, i.e. in a pipe system and in particular a pipe sub-system. The leak detection system comprises one or more fluid consumption meters as described above. In particular the leak detection system may comprise a plurality of fluid consumption meters which may selectively be used for leak detection. For this there is provided an external device, in particular in form of a remote control having a communication device configured for communication with the communication unit of one or more of the described fluid consumption meters. The remote control or external device is configured to send out a leak detection control signal to one or more fluid consumption meters and to receive the data transmitted by one or more fluid consumption meters recorded in their leak detection mode, as described above. In particular the remote control may be configured to send selected addresses identifying certain fluid consumption meters which are desired to be set into the leak detection mode. Those fluid consumption meters, receiving their address in a leak detection control signal, then, switch into the leak detection mode carrying out noise detection and/or transmitting data on basis of the detected noise, as described above. In particular there may be provided many fluid consumption meters in a water distribution network and it is possible to select those fluid consumption meters for leak detection which are close to an assumed leak in the pipe system. By leak detection using a noise detection of the selected fluid consumption meters the leak can be localized.

Furthermore, the leak detection system may comprise at least one leak detection sensor being independent from a fluid consumption meter, the leak detection sensor having a communication unit configured to transmit data to the remote control. Also, the leak detection sensor may be configured such that it offers a possibility to put the leak detection sensor into a leak detection mode similar to the leak detection mode as described above in relation to the fluid consumption meter. The leak detection sensor may for example be a separate sensor arranged on a distribution pipe of the network. This may be a leak detection sensor permanently attached to the pipe or leak detection sensor just being attached for leak detection in a certain area of the pipe system. The leak detection sensor is configured to carry out a noise detection and to transmit data similar as the fluid consumption meter in its leak detection mode. However, it may be possible that the data from the leak detection sensor differ from the data transmitted from said fluid consumption meter. For example, the data transmitted from the leak detection sensor has an improved or higher resolution, higher sampling rate, an improved or greater dynamic range. Furthermore, the leak detection sensor may have an improved sensitivity compared to the noise sensor or noise detection module in the fluid consumption meter. The data provided by the separate leak detection sensor may be analyzed together with data received from one or more fluid consumption meter.

Preferably said leak detection sensor is configured to receive a leak detection control signal from an external device, for example a remote control as described before, via said communication unit and to transmit measured data in response to this leak detection control signal. Thus, the external device or remote control may activate the separate sensors similar as the fluid consumption meters for leak detection so that the external sensors can be used together with fluid consumption meters for leak detection.

Preferably said leak detection sensor comprises a noise detection means, for example a microphone or other suitable acoustic sensor listening into the pipe. By analysis of the detected noise a leak may be detected. The analysis of the noise may be carried out by a control device integrated into the leak detection sensor and/or an external control device, for example the external device or remote control described before.

The external device or remote control, respectively, preferably is configured such that it sets several fluid consumption meters into their leak detection mode at the same time and receives data recorded and transmitted by these fluid consumption meters and/or transmitted by leak detection sensors, wherein the received data preferably are detected at the same time. To detect the measurement at the same time is important to localize a leak by a correlation of the detected signals. Preferably the data representing the detected signals or measurements comprise a times stamp, as described above with reference to the fluid consumption meter. A simultaneous measurement by several fluid consumption meters and/or leak detection sensors can directly be activated by the external device or a remote control, in particular by the leak detection control signal. Alternatively, it may be possible to predefine a point in time for a simultaneous measurement by the different sensors and fluid consumption meters. The preset point in time may be sent to the different sensors and fluid consumption meters using their communication units. The point in time for the measurement may be fixed as an absolute point in time or a relative point in time counted from a signal transmission, for example.

To improve the synchronization in time, which is very difficult in case that a synchronization for example in milliseconds or microseconds should be achieved, according to a preferred embodiment it would be possible to carry out the noise measurement for different overlapping durations. For example, the leak detection sensors being independent from fluid consumption meters may measure for longer time periods or duration, whereas the fluid consumption meters in their leak detection mode make a measurement for shorter period of time. This, in particular is preferably, since the fluid consumption meter likely has to stop the flow measurement during noise detection and, as described above, is sensitive in view of energy consumption. For example, the leak detection sensor may carry out a measurement for a period of time which is more than twenty times longer than the period of time in which the fluid consumption meter listens into the system. Noise frequencies are typically in the range of 100 Hz to 2000 Hz, hence the period of time of the noise signal will be 10 milliseconds to 0.5 milliseconds. For example, the leak detection sensor arranged on a distribution pipe may measure for more than five hundred milliseconds, wherein the flow detection meter for example measures noise for 100 milliseconds. The starting point is set such that there will be an overlap between those time periods and the exact overlap may be detected by a correlation of the detected signals. This may be done in data analysis.

The remote control or external device may comprise a display and may be configured such that it shows the available fluid consumption meters and/or leak detection sensors on the display, preferably on a map, and allows a user selection of one or more fluid consumption meters to be set into leak detection mode and/or leak detection sensor to transmit data. Such a remote control makes it easy for an operator to select those fluid consumption meters and/or leak detection sensors which must listen into the system to detect a leak in a certain area of the pipe system. Furthermore, the operator can choose further sensors or meters to be added in the measurement during the leak detection, for example to refine the localization of a leak.

The remote control may be a software application, preferably to be installed or running on a smartphone or mobile computer. The design and the software application to be installed on a standard commuter or smartphone avoids the need for special hardware and can easily be made available to an operator for leak detection. The remote control, for example, a smartphone, may directly communicate with the sensors and consumption meters via a wireless communication standard implemented into the remote control or smartphone. Furthermore, it would be possible that the remote control or smartphone communicates with a mobile communication network, and directly or indirectly via this mobile communication network and via a special communication network for communication with the flow consumption meters and/or the leak detection sensors. Thus, two different networks may be connected, for example, via a central control device or host computer. Also, a combination of a direct communication with certain sensors and a communication via a special network may be possible.

According to a further embodiment the remote control may be integrated into a fluid consumption meter or a central control device. In particular the remote control may be provided by the control device of a certain fluid consumption meter. Thus, it is possible to control or initiate the leak detection via one fluid consumption meter, for example forming a master fluid consumption meter as described above. The central control device may be a cloud server or central computer connected to the different sensors and fluid consumption meters via any suitable data communication network or different communication networks.

The remote control or external device may be configured such that it initiates a data analysis of the data transmitted by the fluid consumption meters and/or leak detection sensors or leak detection, preferably making a correlation of the data transmitted by different consumption meters and/or sensors, wherein the remote control preferably may be configured such that it performs a data analysis and/or is connected to a separate computing device performing the data analysis. By correlation of the different measurements or data received from several sensors and meters it is possible to localize a leak in the pipe system. The data analysis may comprise further steps, for example for noise reduction, filtering etc. In particular it may be possible to make a state noise measurement and a baseline noise measurement as described above and described in further detail below. The data analysis may be carried out directly in the remote control or external device or this device may communicate with further computing or control systems to carry out the required data analysis.

The remote control may be configured such that it receives the data transmitted from the fluid consumption meters and/or the leak detection sensors either directly or indirectly via a data network and/or via a computing device, wherein the computing device preferably is configured such that it performs data analysis and/or data conversion for the received data and transmit processed data to the remote control, for example by a signal harmonization module, which may be a software module. Data conversion may transform data from different sensor devices and flow meters into a same data standard or language to carry out a correlation on basis of the different data. It may be possible to carry out the different steps for data analysis or data conversion in different computing devices or control devices. The final data analysis for leak detection may be carried out in the remote control or in an external computing device such that the remote control just receives the analysis result to present the result to the user. Thus, the remote control may act as a user interface, only.

According to a special embodiment of the invention the one or more fluid consumption meters and/or leak detection sensors are configured such that they perform a state noise measurement and baseline noise measurement and record and/or transmit measured data or data calculated on basis of these measured data to said remote control preferably in said leak detection mode. The baseline noise measurement may detect the baseline noise in a pipe system or pipe sub-system which, then, later during data analysis of the state noise measurement can be eliminated from the signal.

According to a further possible embodiment of the invention there may be provided at least one valve being arranged in a pipe system, in particular arranged between a pipe sub-system and a further part of the fluid supply system. The at least one fluid consumption meter and/or at least one leak detection sensor is arranged inside the pipe sub-system and the fluid consumption meter and/or the leak detection sensor are configured such they perform a baseline noise measurement with the valve closed and perform a state noise measurement with the valve at least partly open. This allows to detect a baseline noise of a pipe sub-system independent from the noise resulting from fluid flow into the pipe sub-system. During the data analysis the measured baseline noise can be used to process the signal detected during state noise measurement to eliminate the base noise from this signal.

In the following further preferred aspects or embodiments of the invention are described.

An acoustic sensor or noise detection module connected to the pipe sub-system, is typically placed in a location with restricted access say in a room in a house or in an enclosure. The acoustic sensor preferably is an integrated part or functionality of a fluid consumption meter. The actual determination of the pipe present state may advantageously be performed in a different location such as outside the room, outside the house or outside the enclosure.

There may be an act of providing a state noise measure established by the noise detection module or an acoustic sensor, respectively. The acoustic sensor may be configured to measure sound or acoustic signals in pipes of fluid in the pipes. The state noise measure may be an acoustic profile of the pipe sub-system at the time the measure is provided. The acoustic sensor may be configured to extract a measure of the level or type, i.e. characteristics, of the sound or acoustic signal. The acoustic sensor is configured to transmit the state noise measure in particular via said communication unit. The transmission may be wireless and the transmission may be in communication with an external device such as a detector or remote control, e.g. a leak detector unit, or other unit operated away from the acoustic sensor. The transmission, and the act of measuring, may be triggered, for example by the leak detection control signal, by the external device say operated at a location away from the location of the acoustic sensor, such as at the location of a control valve.

The act of providing a state noise measure may be an act of transmitting the state noise measure established by the acoustic sensor. The state noise measure may be sent to the external device, remote control or to a back-end system or central processor of an advanced meter infrastructure from where the external device may retrieve the state noise measure. The transmission between the external device and the acoustic sensor may be part of a one-way communication session wherein the acoustic sensor sends measures and possible other data to the external device or a two-way communication session wherein measures and/or other data is sent in both directions between the acoustic sensor and the external device.

There may be an act of adjusting a control valve. The act of adjusting the control valve may be performed manually. The level of adjusting may depend on the circumstances. Adjusting may be closing or opening or changing the level of the control valve being open or closed. The control valve may be fully opened or closed. The control valve may be partially closed. In principle there could be an act of opening a closed control valve. As such there may be a measurement before and after changing, i.e. opening or closing, the control valve.

A control valve may be understood to be a valve controlling the flow to the acoustic sensor, such as a district valve controlling the supply to multiple points of consumption or a connection valve controlling the supply to a single of few point of consumption. For example, there may be one or more control valves controlling the flow to the acoustic sensor and one control valve may also control the flow to multiple acoustic sensors.

There may be an act of transmitting a baseline noise measure established by the acoustic sensor. The act of providing the baseline noise measure may be performed as disclosed above in connection with the state noise measure. The act of providing the baseline noise measure may be initiated by the acoustic sensor or an external device or remote control, such as based on a certain measurement frequency implemented by the acoustic sensor, or based on requests or commands received by the acoustic sensor from the external device.

The noise measure may be a collection of raw sampled data. A reduction of parameters in the noise measure could be done through digital data processing of the converted output from the acoustic sensor. It may specifically be a simple maximum or a root-mean-square (RMS) calculation to provide a value representing a measure of the overall noise level. E.g. in a selected frequency band, such as 10-1000 Hz.

In another example the noise measure may be a statistical analysis of the raw sampled data including the mean, standard deviation and higher order moments. More sophisticated analysis could also be used to establish the noise measure through frequency filtering into certain frequency bands, followed by an RMS calculation, to provide a range of noise figures associated with different frequency bands. Frequency filtering may also be introduced in order to remove unwanted known frequencies like the mains frequency.

Furthermore, a full Fast Fourier Transform (FFT) may be performed to provide a full spectrum of acoustic signals, involving noise power density as well as associated phase information. The latter level of analysis may be desirable, in order to perform a cross correlation calculation with the purpose of triangulating the location of the noise source or leak. However, for many practical purposes the information coming from the simpler noise figure calculations suffices to indicate the position of the noise source.

A long-time-evaluated noise measure may also be generated from multiple noise measures created by the acoustic sensor. The period between sampling each noise measure may be substantially longer than the time involved in creating a single noise measure. Such noise measure may be one single value indicative of an average-type noise level.

Furthermore, the acoustic sensor or external device may be arranged to calculate a plurality of values indicative of respective spectral components of average noise level, e.g. corresponding to selected frequency bands like 1/1 octave or 1/3 octave levels etc. going towards the full frequency spectrum.

The acoustic sensor may also be arranged to calculate a peak value indicative of a peak noise level for a period of time. In addition, the acoustic sensor or external device may be arranged to calculate a plurality of different values indicative of the noise level for the period of time, these could be statistical parameters such as the mean, RMS-value, the standard deviation or higher order moments. By measuring over a period of time and processing the measured signals, it is possible to reduce the amount of data to be communicated from the acoustic sensor.

Both long-time-evaluated noise level (calculated from multiple noise measures acquired over a distribution of times) and/or instantaneous noise measure (only a single noise measure) may be provided, the main difference being the time scale involved in producing these numbers.

A person skilled in the art will appreciate the principles outlined above to establish a noise measure and thus derive measures of baseline noise or state noise. From such measures leaks can be detected and classified. Alternatively, noise measures may be applied to determine the present state of the pipes of the pipe sub-system.

There may be a further act of activating the acoustic sensor to establish a state or a baseline noise measure remotely. The act allows for an operator to conveniently operate the control valve and request data accordingly.

The baseline noise measure may provide the baseline. The state noise measure may provide additional information and the difference between the two measures may be used to determine the present state.

The determination, calculation or look-up may be performed in the detector, in a decentralized processor or cloud based processor, or performed by a central processor.

As such a person skilled in the art will be able to implement the computational part in a variety of platforms. The computation may be performed in or by the acoustic sensor and the present state be determined by the acoustic sensor. The computation may also be performed in or by a consumption meter or smart meter including the acoustic sensor and the present state be determined by the consumption meter or in cooperation between the consumption meter and acoustic sensor.

The act of transmitting may be followed by an act of receiving the baseline or state noise measures. The receipt may be by a detector; by a decentralized processor or cloud based processor; or by a central processor.

As such the data transmitted by the acoustic sensor is collected by at least one unit for determining, further transmittal, storage or otherwise processing. That is, the act of determining is performed by one or more of a detector, a decentralized processor or cloud based processor or a central processor.

The above disclosed methods and systems may be used for or configured to handle a pipe sub-system with multiple consumption places and multiple acoustic sensors arranged at one, more or all of these consumption places.

There may be a method, wherein the acts are performed on a utility distribution system including a pipe sub-system arranged between a control valve and multiple acoustic sensors. The acts may be performed on one or more acoustic sensors. Thus, an operator may have the control valve opened and perform noise measure from at least one, more or all acoustic sensors. There may be multiple state noise measures for corresponding acoustic sensors. The operator may close the control valve and perform the baseline noise measurements from respective acoustic sensors.

An objective may be achieved by a leak detection system comprising means for carrying out the acts as disclosed above. It is understood that an act may obviously be carried out manually. E.g. the act of closing or opening a control valve may be performed manually. The operation of the control valve may however also be performed automatically and as such with means, i.e. automation or actuator means, for closing or operating the control valve.

An objective may be achieved by an acoustic sensor or a consumption meter comprising an acoustic sensor or noise detection module. The acoustic sensor or consumption meter comprises a communication unit configured to receive an activation or leak detection control signal and to transmit a measure and other data. The acoustic sensor or consumption meter may be configured to perform respective baseline and state acoustic noise measurements and transmit respective baseline and state noise measures after receiving respective first and second activation signals.

An objective may be achieved by a detector comprising a transmitter configured to send an activation signal and to receive a noise measure. The detector is configured to determining a present state of a pipe sub-system as a function, a state noise measure and a baseline noise measure.

A detection kit comprising the acoustic sensor or consumption meter including the acoustic sensor as described and the detector as described may be configured for mutual communication and interaction. As such, a detection kit may be used for determining a present state of a pipe sub-system between a control valve and at least one acoustic sensor.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
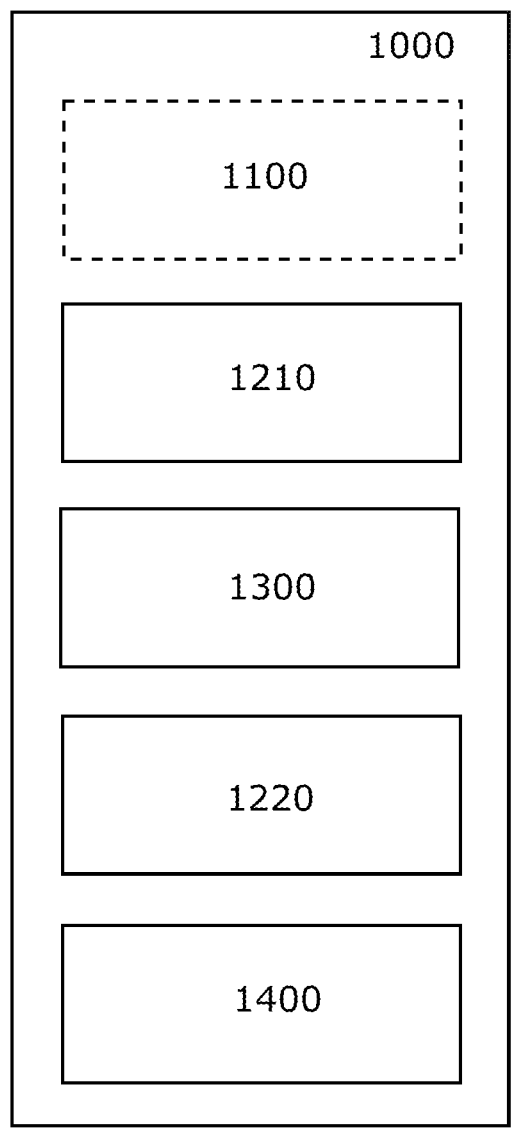
FIG. 1 shows a method of determining a present state of a pipe sub-system between a control valve and an acoustic sensor.
Figure 5:
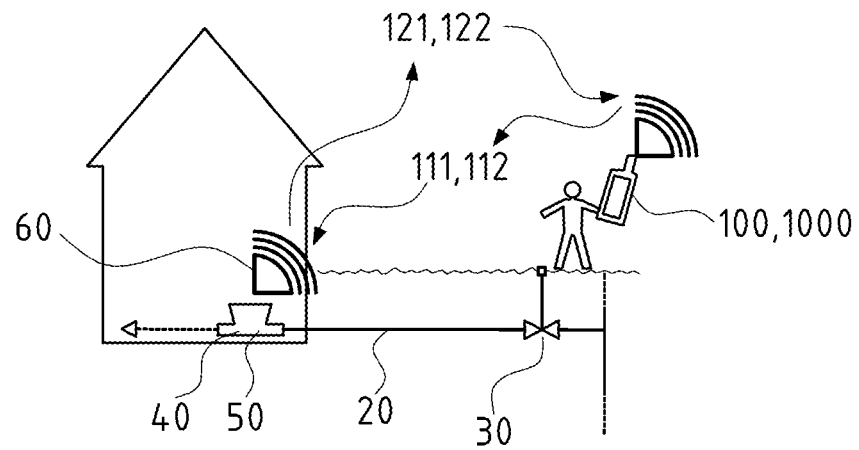
FIG. 5 shows an installation of a pipe sub-system between a control valve and an acoustic sensor; and an example of an operator with a detector.
Figure 6:
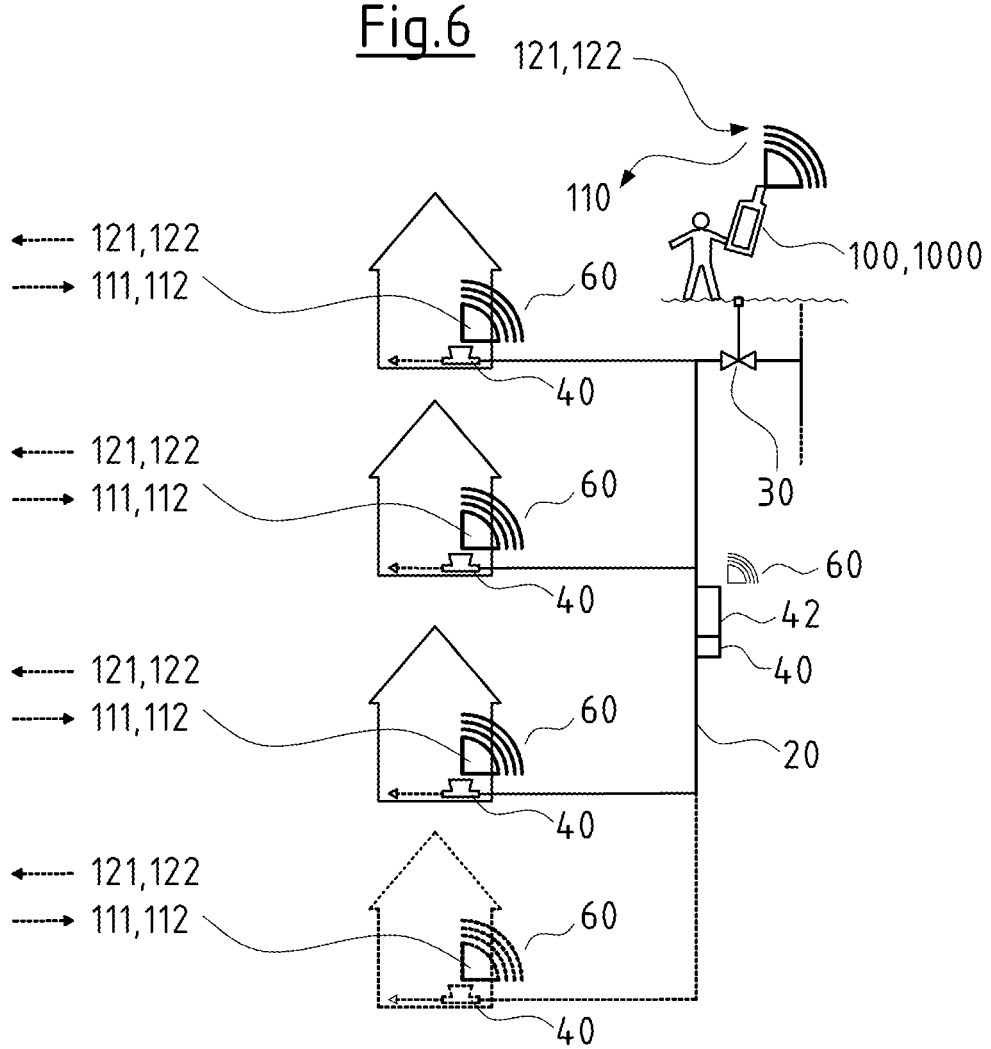
FIG. 6 shows a system with a pipe sub-system and multiple acoustic sensors.

Referring to the drawings, FIG. 1 illustrates a method of determining 1000 a present state of a pipe sub-system 20 being part of a larger fluid supply or utility distribution system, such as municipality water network. The pipe sub-system is located between a control valve 30 and one or more acoustic sensors 40 as illustrated in FIGS. 5 and 6 and as will be further described below.

The method includes an act of providing 1210 a state noise measure 121 established by the noise detection module or the acoustic sensor 40. The act of providing 1210 the state noise measure may be an act of transmitting the state noise measure 121. Measurements of the noise are performed by the acoustic sensor 40 as a stand-alone unit or as included in a consumption meter 50. Alternatively, the measurements of noise may be performed by a stand-alone acoustic sensor like leak detection sensor 42. Based on these measurements the state noise measure is established by the acoustic censor and/or the consumption meter, as will also be explained in more detail below.

The state noise measure is performed with the control valve 30 in an open or partly open condition such that water may flow from the utility distribution system into the pipe sub-system.

Following the establishment of the state noise measure, there is an act of adjusting or closing or partly closing 1300 the control valve 30 to prevent or restrict the flow into the pipe sub-system from the utility distribution system. This act may be performed by an operator manually operating the control valve or automatically if for example the control valve is configured for remote activation. Following the closing of the control valve the acoustic sensor performs another measurement of noise and based on this another noise measure, determined a baseline noise measure 122, is established.

As envisaged by the skilled person, the measurements of noise when the control valve in the closed or partly closed condition or in the open or partly open condition may also be performed in the opposite order such the baseline noise measure is established before the state noise measure.

Additionally, there is an act of transmitting 1220 the baseline noise measure 122 established by the acoustic sensor 40. The acoustic sensor 40 transmits the measures for processing, e.g. in a detector as illustrated in FIG. 5.

Further, there is an act of determining the present state 1400 as a function of the state noise measure 121 and the baseline noise measure 122. The detector 100 or remote control 100 forming an external device may perform the act of determining the present state of the pipe sub-system as will be further described below. The detector or remote control 100 may communicate with a further external computing system like a central processor or further control unit 210. Parts of the data analysis described before and the following may be carried out by such central processor 210.

As illustrated there may also be a further act of activating 1100 the acoustic sensor 40 to establish the state or baseline noise measure remotely. The activation may be based on an activation signal 110 transmitted from the detector 100 to the acoustic sensor.

Figure 2A:
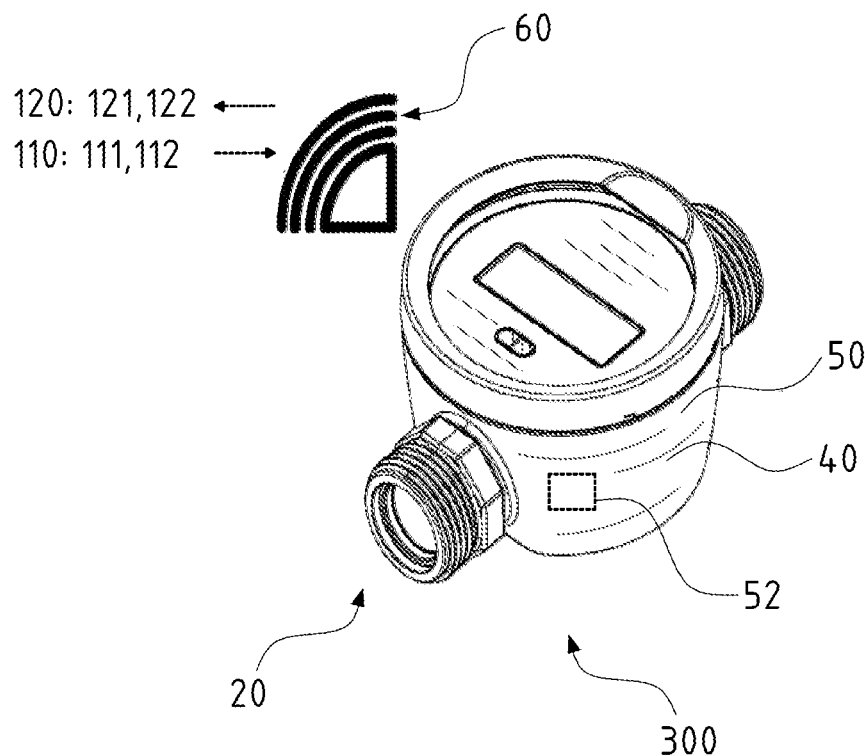
FIGS. 2A and 2B shows an acoustic sensor and a detector.

FIG. 2A illustrates an exemplary embodiment of an implementation of an acoustic sensor 40 integrated into a fluid consumption meter 50. The acoustic sensor 40 is adapted for being connected to the pipe sub-system 20 and is configured to measure noise or acoustic signals from the fluid flow in the pipe sub-system 20. Based on the measurements of noise, the acoustic sensor is configured to establish measures of noise also referred to as state noise measures 121 and baseline noise measures 122. The noise measures may be established by a processing unit in the acoustic sensor or in a processing unit in the consumption meter 50 in which the sensor is included. If the acoustic sensor 40 is an integrated part of the consumption meter 50, a common processing unit, also used to determine flow and consumption by the consumption meter 50, may also be used to establish the noise measures.

The noise measure established may be comprised by one or multiple values determined by the acoustic sensor 40. The acoustic sensor 40 may be a dedicated acoustic sensor, such as a transducer including a piezoelectric element, or it may be based on another sensor technology known in the art, such as being a capacitive sensor, an inductive sensor, an optical sensor, or a piezo-resistive sensor, such as a piezoresistive strain gauge. The acoustic sensor 40 may also be a transducer including a piezoelectric element that is also used for ultrasonic flow measurements, for example according to a time-of-flight principle.

Measuring noise or the acoustic profile to establishing a noise measure, using a dedicated acoustic sensor or a transducer used for ultrasonic flow measurements is further described in the earlier published patent application by the applicant, International publication number WO 2017/005687.

The output from the acoustic sensor 40 is one or more electrical signals, either analog or digital. To suppress undesired frequencies (such as the mains frequency) or focus on a specific frequency band, like 10-1000 Hz, analog electrical signals from the acoustic sensor may be electronically filtered. These electronic filters may be high pass filters, low pass filters, notch filters, comb filters and band pass filters. The electrical filters may be simple first order RC filters or cascaded versions of such. Higher order filter types like LCR may also be used. Following the initial electronic filtering, analog evaluation components like peak-detectors, RMS detectors or switchable filters may be implemented resulting in one or a plurality of values indicative of the noise.

Following electronic filtering and analog evaluation, the signal may be digitized using an analog-to-digital converter (ADC) with a bandwidth chosen to match the bandwidth of the electronic filtering. Alternatively, the analog signal may also be converted from analog to digital without electronic filtering and analog evaluation. In one embodiment the bandwidth of the ADC is 2 kHz but other bandwidths, such as 200 Hz-5 kHz may be applied. The overall sampling time may range from approximately 100 milliseconds (ms) to 1 second or more. In one embodiment the sampling period is approximately 250 ms resulting in a frequency resolution of 4 Hz when the ADC bandwidth is 2 kHz.

The noise measure may be a collection of raw sampled data. A reduction of parameters in the noise measure could be done through digital data processing of the converted output from the acoustic sensor 40. It may specifically be a simple maximum or a root-mean-square (RMS) calculation to provide a value representing a measure of the overall noise level. E.g. in a selected frequency band, such as 10-1000 Hz.

In another example the noise measure may be a statistical analysis of the raw sampled data including the mean, standard deviation and higher order moments. More sophisticated analysis could also establish the noise measure through frequency filtering into certain frequency bands, followed by an RMS calculation, to provide a range of noise figures associated with different frequency bands. Frequency filtering may also be introduced in order to remove unwanted known frequencies like the mains frequency.

Furthermore, a full Fast Fourier Transform (FFT) may be performed to provide a full spectrum of acoustic signals, involving noise power density as well as associated phase information. The latter level of analysis may be desirable, in order to perform a cross correlation calculation with the purpose of triangulating the location of the noise source. However, for many practical purposes the information coming from the simpler noise figure calculations suffices to indicate the position of the noise source.

Throughout all the different noise measure generation methods digital filtering could be applied. Some examples are, but not limited to, FIR filters and IIR filters. The filter characteristic could be high pass filters, low pass filters, notch filters, comb filters and band pass filters. Known undesired frequencies, such as the grid frequency, could also be suppressed in this way.

To create more historical knowledge an additional long-time-evaluated noise measure may be generated from multiple noise measures created by the acoustic sensor. The period between sampling each noise measure may be substantially longer than the time involved in creating a single noise measure. Such noise measure may be one single value indicative of an average-type noise level.

Furthermore, the acoustic sensor 40 may be arranged to calculate a plurality of values indicative of respective spectral components of average noise level, e.g. corresponding to selected frequency bands like 1/1 octave or 1/3 octave levels etc. going towards the full frequency spectrum.

The acoustic sensor 40 may also be arranged to calculate a peak value indicative of a peak noise level for a period of time. In addition, the acoustic sensor 40 may be arranged to calculate a plurality of different values indicative of the noise level for the period of time, these could be statistical parameters such as the mean, RMS-value, the standard deviation or higher order moments. By measuring over a period of time and processing the measured signals, it is possible to reduce the amount of data to be communicated from the acoustic sensor.

Both long-time-evaluated noise level (calculated from multiple noise measures acquired over a distribution of times) and/or instantaneous noise measure (only a single noise measure) may be provided, the main difference being the time scale involved in producing these numbers.

Still referring to FIG. 2A, the acoustic sensor 40 further comprises communication means or a communication unit 60 configured to receive activation signals 110 e.g. a first activation signal 111 and a second activation signal 112. The acoustic sensor 40 also comprises communication means configured to transmit results of the measured noise signals or noise measures 120 e.g. the state noise measure 121 and the baseline noise measure 122.

Figure 2B:
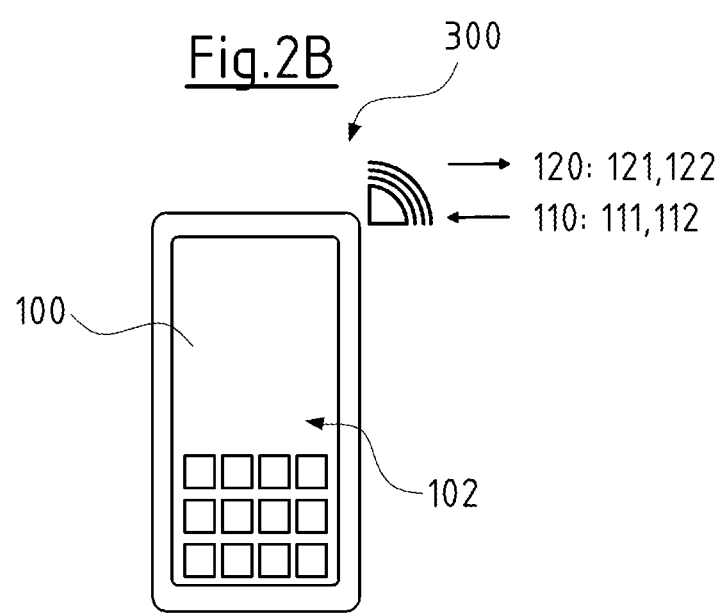

FIG. 2B discloses the detector or remote control 100, e.g. a leak detector unit, comprising a transceiver configured to send activation signals 110 and to a receive noise measures 120, e.g. the first and second activation signals 111, 112 and noise measures 121, 122. Further, the detector 100 may be configured to and provided with means for determining the present state 1400 of a pipe sub-system 20 as a function of the state noise measure 121 and the baseline noise measure 122. The detector or remote control 100 may be a smartphone with a respective software application. The smartphone may communicate via a communication unit with a mobile communication network and/or directly with the communication units 60 of the acoustic sensors 40. This may be possible by the same mobile communication standard or any other suitable wireless communication standard.

Turning to FIG. 5, a fluid supply or utility distribution system to which the outlined method may be applied, is shown. The utility distribution system includes a pipe sub-system 20 arranged between a control valve 30 and an acoustic sensor 40 installed in a house. The pipe sub-system is considered to have a present state being a condition such as, but not limited to, leak(s) existing in the pipes, the pipes being corroded or subject to fouling, the flow being turbulent, laminar, with cavitation, etc.

The noise detection module or acoustic sensor 40, respectively, is shown to comprise communication means 60 configured to receive an activation signal 110 and to transmit a noise measure 120. The acoustic sensor 40 is configured to establish state noise measures 121 and baseline noise measures 122. The acoustic sensor may be configured to send the noise measures autonomously or to transmit the noise measures after receiving respective first and second activation signals 111,112 form the detector 100. The detector 100 being configured to be operated by an operator being able to close 1300 and control the control valve 30.

FIG. 6 illustrates another fluid supply or utility distribution system to which the outlined method may be applied. The utility distribution system includes a pipe sub-system 20 arranged between a control valve 30 and multiple acoustic sensors 40 installed in different houses, wherein the noise detection modules or acoustic sensors 40 in this example are integrated into fluid consumption meters 50. The detector 100 is configured as previously outlined and further configured to communicate and interact with multiple acoustic sensors 40. The detector 100 is configured to transmit multiple activation signals 110. As for a first acoustic sensor 40, the detector 100 is configured to transmit a first and second activation signal 111, 112 and the first acoustic sensor is configured to perform respective state and baseline noise measure 121, 122. Likewise the detector 100 is configured to interact with the second and further acoustic sensors and determine a present state based on noise measures received from these meters.

Determining the present state of a pipe sub-system connected to multiple acoustic sensors 40 may involve considering the baseline noise measures and state noise measures from multiple acoustic sensors 40. Based on the plurality of measures, the present state of the pipe sub-system or a part thereof may be determined.

Figure 3:
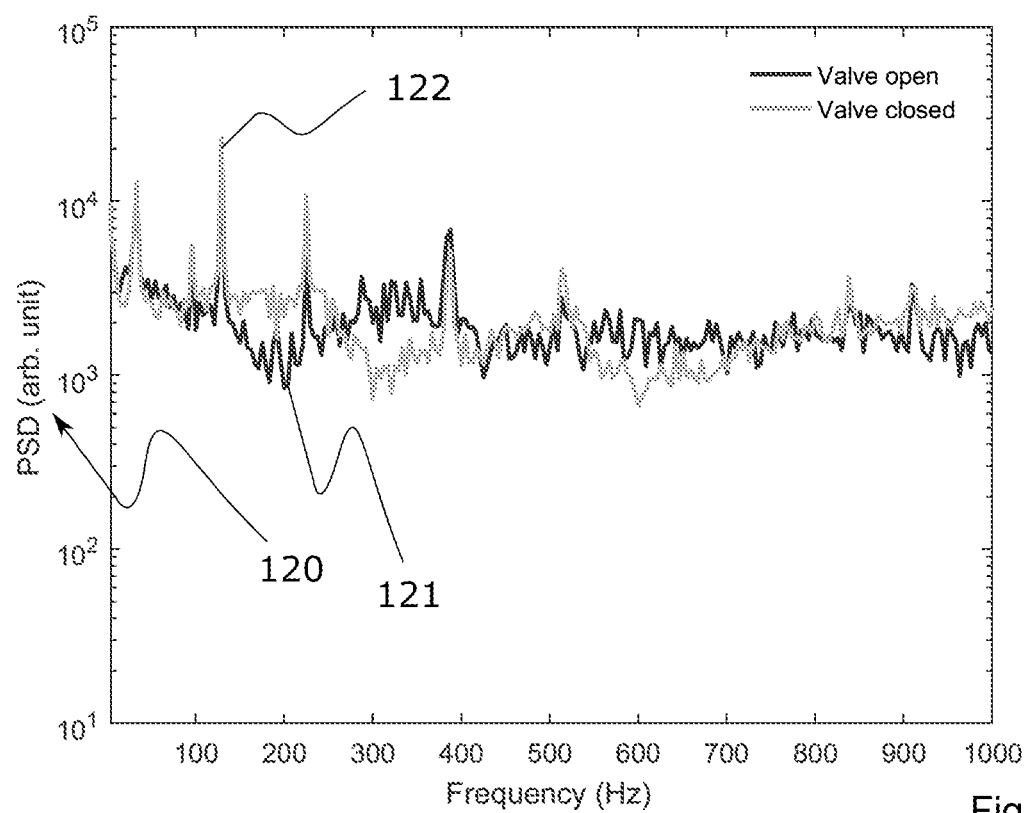
FIG. 3 shows a state and baseline noise measures; e.g. from inside a house.
Figure 4:
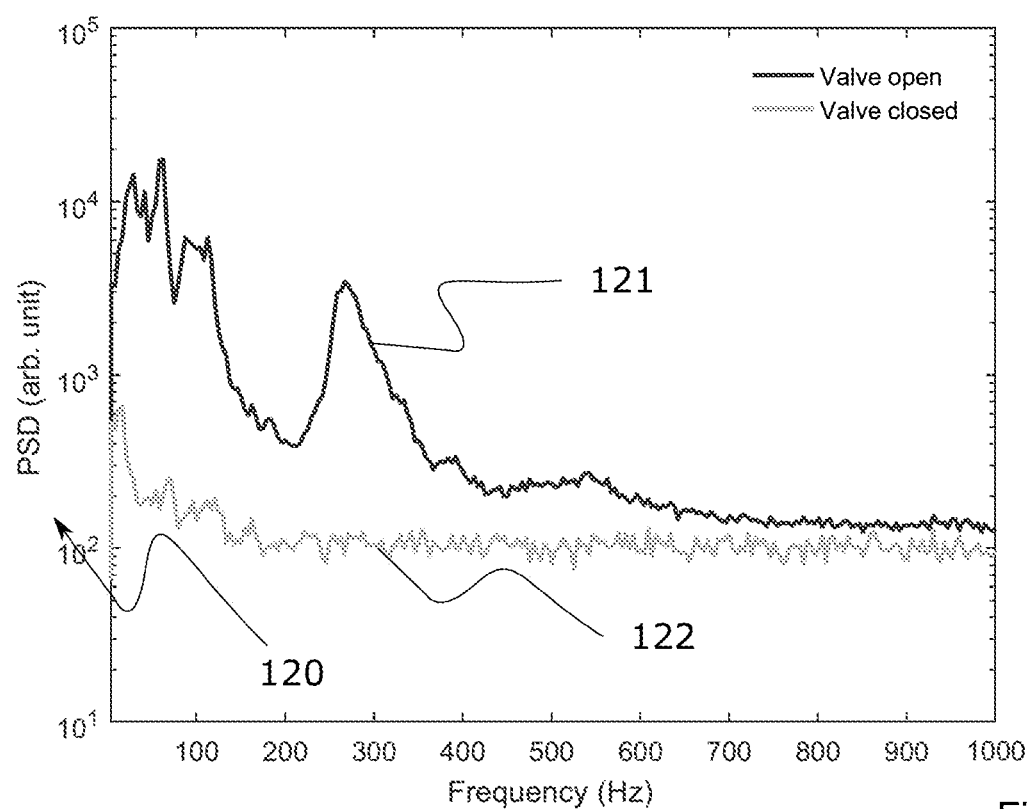
FIG. 4 shows a state and baseline noise measures; e.g. from outside a house.

With reference to FIGS. 3 and 4, the process of determining the present state of a pipe sub-system will be described in the following. FIGS. 3 and 4 illustrates different scenarios and each shows two different noise measures 120 established by the acoustic sensor and/or consumption meter 50. The noise measures 120 are illustrated as Power Spectrum Density (PSD). One noise measure is the state noise measure 121 illustrating the acoustic profile of the pipe sub-system when the control valve 30 is open and the other is the baseline noise measure 122 illustrating the acoustic profile of the pipe sub-system when the control valve 30 is closed. In this regard reference is made to FIGS. 5 and 6 illustrating pipe sub-systems arranged between a control valve 30 and one or more acoustic sensors 40, respectively.

In the scenario illustrated in FIG. 3, the difference between the baseline noise measure and the state noise measure is less significant indicating that the acoustic sensor 40 mainly detects "local noise", being noise originating from the local piping network of the specific installation. This could be the piping network of a domestic house and the noise could originate from circulation pumps, heat exchangers or the like installed inside the house.

FIG. 4 illustrates another scenario wherein the difference between the baseline noise measure and the state noise measure is more significant. As seen, the state noise measure 121 indicating the acoustic profile when the control valve is open, is much higher than the baseline noise measure. The noise detected by the acoustic sensor thus mainly originates from the pipe sub-system 20 or remaining part of the utility distribution system outside the housing. Noise in this scenario would come from equipment, such as pumps or valves, installed in the utility distribution system or be caused by leaks in the utility distribution system, including the pipe sub-system.

The present state of a pipe sub-section may thus be computed or derived based on one or more differences or discrepancies between the baseline noise measure and the state noise measure from an acoustic sensors. The present state of a pipe sub-system may also be computed or derived based on one or more differences or discrepancies between the baseline noise measures and the state noise measures from multiple acoustic sensors. In determining the present state, differences between baseline- and state noise measures may be considered at discrete point in time over a period of time. The present state may for example be determined based on a development in the difference between baseline- and state noise measures over time. An increase in the difference between baseline- and state noise measures over time may for example indicate a leak that is evolving, such as growing in size. Various statistical parameters may also be derived from the development in differences between baseline- and state noise measures over time and used to determine the present state.

Figure 7:
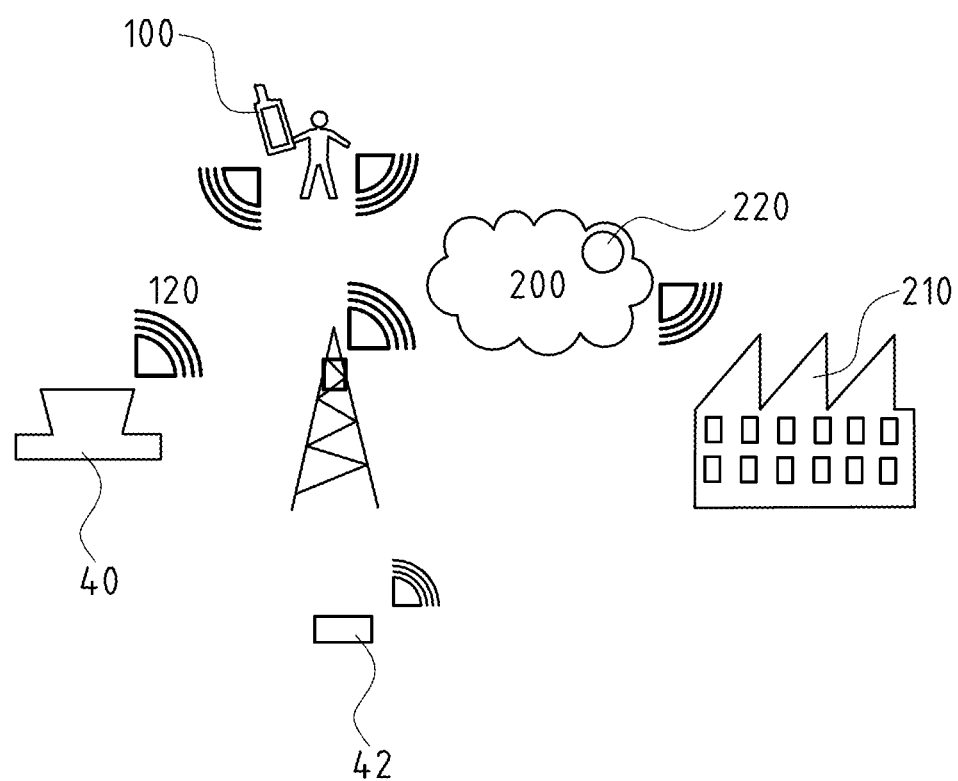
FIG. 7 shows embodiments of computational implementations.

FIG. 7 illustrates a configurations where the method is performed by using remote control or a detector 100; a decentralized processor or cloud based processor 200; or a central processor 210. Noise measures 120 from an acoustic sensor 40 may be transmitted to a cloud 200 directly, via a communications system or via a detector 100, or via a separate special communication network for the acoustic sensors 40.

The method of determining the present state of a pipe sub-system may involve an act of receiving one or more noise measures 120 in a decentralized processor or cloud based processor 200; or a central processor 210. Likewise the act of determining may be performed by one or more of a decentralized processor or cloud based processor 200; or a central processor 210. In particular complex data analysis may be provided by a cloud based processor 200 or control processor 210. The results from one or more acoustic sensors 40 may be communicated to and managed by a company. The company may prioritize leaks and organize repairs accordingly.

The acoustic sensor and the detector described above may also be part of a detection kit or leak detecting system 300 comprising means for carrying out the acts as disclosed. That is the non-manual acts. Such detection kit or leak detection system may be used for determining 1000 a present state of a pipe sub-system 20 between a control valve 30 and at least one acoustic sensor 40. The detection kit may also be configured to detect leaks in the pipe sub-system.

Figure 8:
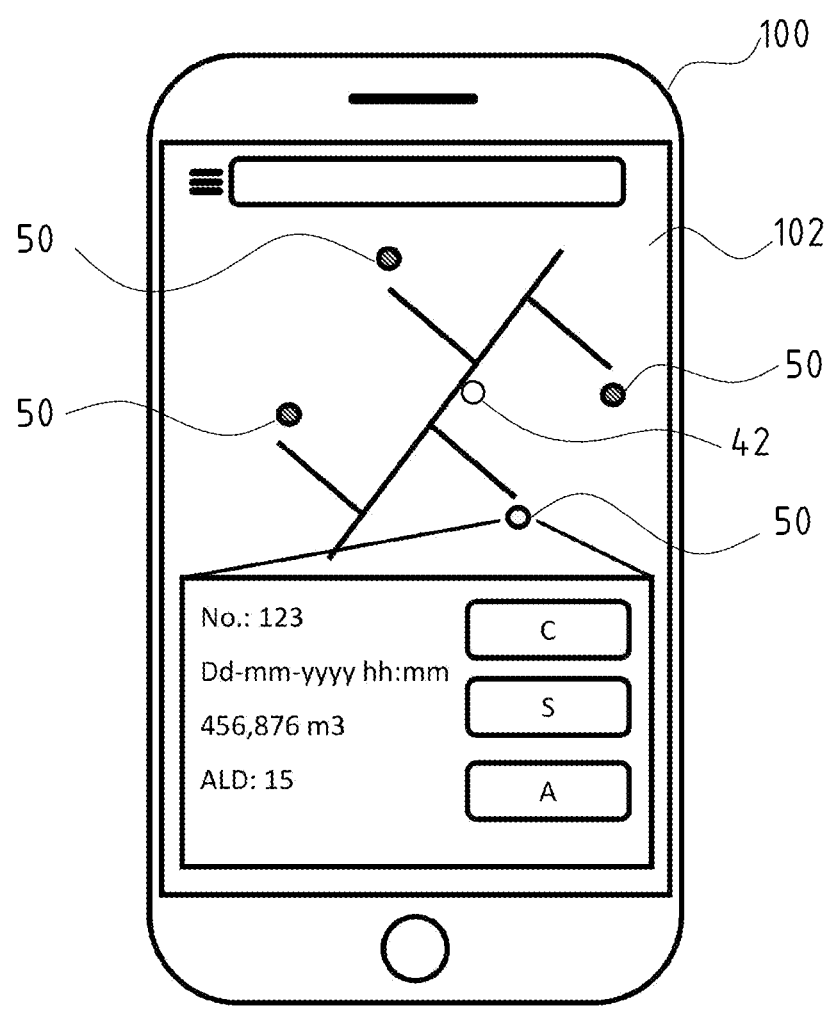
FIGS. 8, 9, and 10 show a remote control with three different views of the display.
Figure 9:
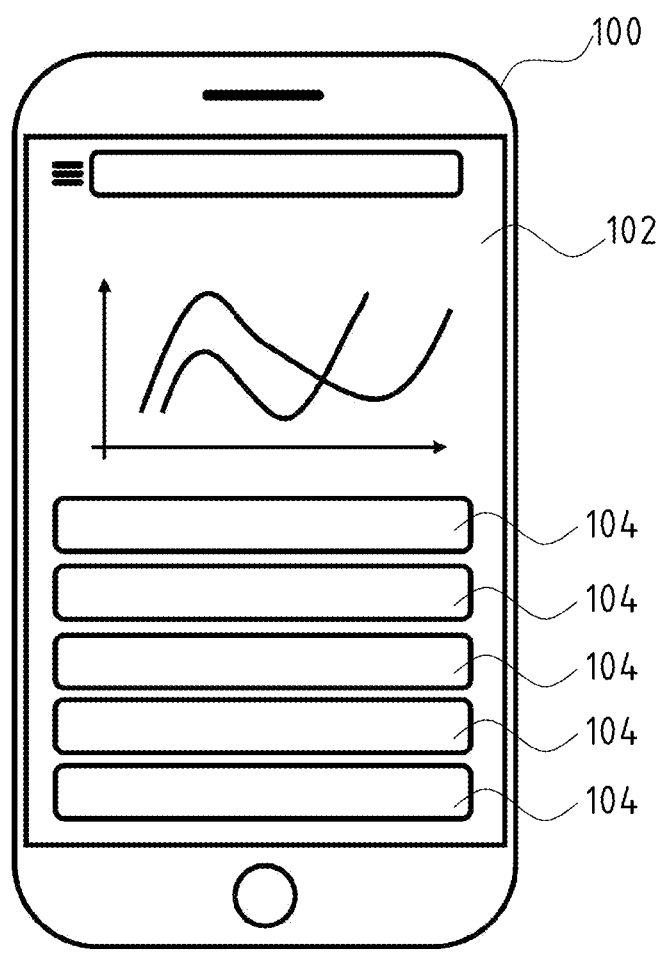
Figure 10:
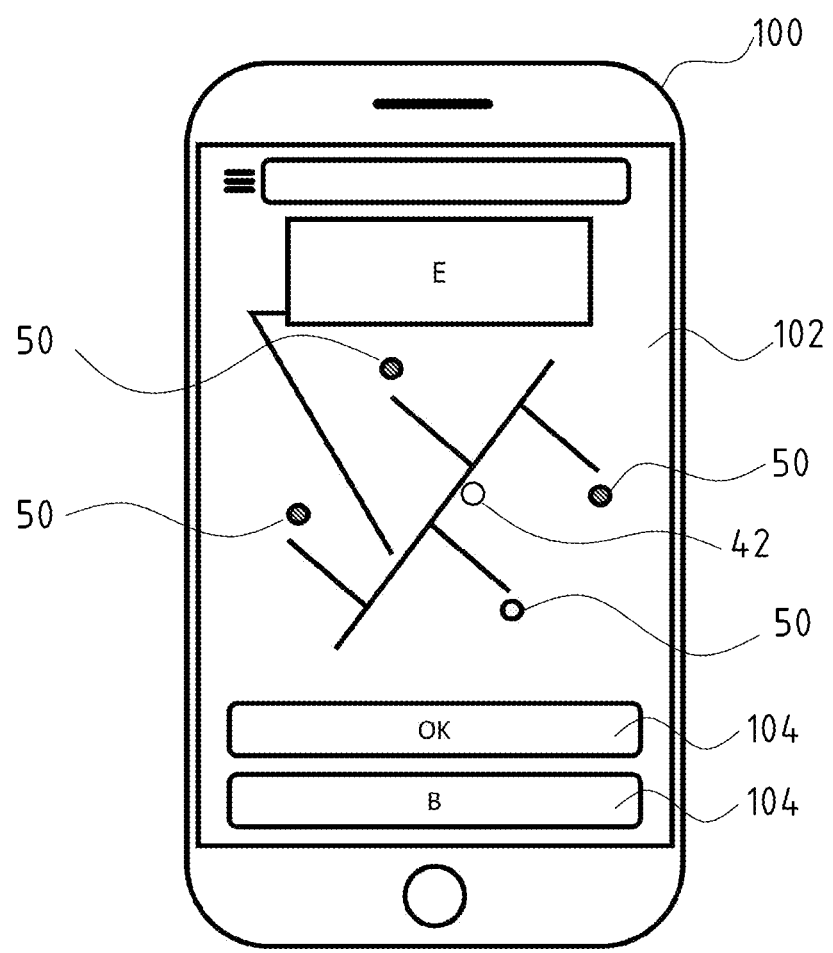

With reference in particular to FIGS. 8 to 10 a further aspect is described by way of example. In this example the detector 100 is a smartphone 100 forming a remote control with a software application for leak detection. The remote control 100 has a display 102 visualizing the liquid supply network or pipe system with the different acoustic sensors 40 provided in the consumption meters 50 and a separate leak detection sensor 42 which are available in the pipe system. As shown in FIG. 8 the user may touch on the respective sensor 42 or consumption meter 50 shown in the map to see detailed information and to choose an action. This action may be clicking on one of the three keys C, S and A which allow to connect C, to receive a status S or start an analysis A. When clicking A the smartphone 10 will send a leak detection control signal to the special sensor 42 or the consumption meter 50 identified by a certain address, in this example "123". This leak detection control signal may be send directly to the communication unit 60 of the consumption meter 50 or leak detection sensor 42 using a suitable wireless communication standard which is implemented in the communication unit 60 and in the remote control 100. Alternatively, it is possible, that the signal is send from the remote control 100 via a mobile communication network to a central computer like a decentralized processor 200 and then send via a separate communication network to the communication unit 60. Thus, there may be a direct or indirect communication between the remote control 100 and the communication unit 60. When receiving the leak detection control signal the consumption meter 50 is set in a leak detection mode starting an acoustic or noise measurement by using the acoustic sensor 40, i.e. starts listening into the pipe system. The measured data then may be sent back directly to the remote control 100 or via the network to the decentralized processor 200 or the central processor 210 for data analysis. The result of the data analysis then is sent back to the control device 100 to be visualized on its display 102.

For the data analysis the remote control 100 may offer several options as for example shown in FIG. 9. In this status the display 102 can visualize the measurement results of acoustic sensor 40, i.e. a flow consumption meter 50 or leak detection sensor 42. The display 102 may offer different virtual keys 104 to select further options. This, for example may be the playback of the sampling, a frequency analysis, a calculation of the leak location, to save the result and to show the final analysis. The final analysis or detection of the leak may be displayed as shown in FIG. 10. In this step the display 102 again shows the map of the pipe system with the position of E of the estimated leak location. There are again offered virtual keys 104 for choosing further actions like saving the results or going back.

The use of a remote control 100 like a smartphone having a display 102 showing a map of the pipe system makes it easy to choose those leak detection sensors 42 and flow consumption meters 50 which should send noise measurement for localizing the leak. By using several sensors 40 a correlation can be made to better localize the leak in the system. The use of different sensors like the sensors 40 in the flow consumption meters 50 and separate leak detection sensors 42 may give rise to the problem that they are not using the same data protocol, i.e. "do not speak the same language". To overcome this problem there may be arranged a signal harmonization module 220 in the system. In this example this module is shown as part of the centralized processor 200. However, one or more signal harmonization modules 220, which preferably are software modules, may be arranged at any suitable device in the system.

Furthermore, it may be a problem that all the sensors 40 should make a noise measurement at the same time. It may be difficult to synchronize the measurements. Thus, it may be possible that the leak detection control signal sent out by the remote control 100 does not directly start the measurement but defines a predefined point in time for starting the measurement, for example half an hour from now. Furthermore, the measurement times or durations in the consumption meters 50 and leakage detection sensors 42 may be different, preferably the leakage detection sensors 42 carry out a measurement for a longer duration so that an overlap of the measurements can be secured. The exact point in time at which all the sensors 40 are measuring at the same time may be found by a correlation in a data analysis.

Since the energy supply of the fluid consumption meters 50 is provided by batteries 52 the management of the energy consumption of the meters 50 is very important. Thus, the control device inside the flow consumption meter 50 is configured to reject the leak detection mode in case that there is not enough remaining energy in the battery to ensure the lifetime of the fluid consumption meter 50. This may be done by just counting the number of uses of the leak detection mode or by measuring the remaining battery capacity.

While specific embodiments of the invention have been shown and described in detail to illustrate the application of the principles of the invention, it will be understood that the invention may be embodied otherwise without departing from such principles.

The invention claimed is:

1. A fluid consumption meter for a utility water distribution system and configured to measure a flow rate of a fluid, the fluid consumption meter comprising:
   a noise detection module for leak detection;
   a control device comprising a bi-directional communication unit, wherein the control device is configured to receive a leak detection control signal from an external device, to set the fluid consumption meter into a leak detection mode upon reception of the leak detection control signal, and to start a noise detection for leak detection in said leak detection mode and to transmit data from said noise detection module; and
   at least one battery for energy supply, wherein one of:
      said control device is configured such that the control device rejects a desired change into the leak detection mode if one of:
         a power consumption violates a desired lifetime of the battery calculated by an algorithm inside the control device;
         a predetermined maximum time of an increased power consumption in the leak detection mode is reached; and
         a limit for the number of activations of the leak detection mode preset in the control device has been reached; and
      said control device is configured such that the control device terminates the leak detection mode if one of:
         a predetermined maximum time of an increased power consumption in the leak detection mode is reached; and a power consumption violates a desired lifetime of said battery calculated by an algorithm inside the control device.

2. The fluid consumption meter according to claim 1, wherein the control device and the noise detection module are configured such that acoustic noise is recorded in said leak detection mode.

3. The fluid consumption meter according to claim 1, wherein the control device is configured such that in said leak detection mode the control device can be controlled by an external device via said communication unit.

4. The fluid consumption meter according to claim 1, wherein the control device is configured to receive a leak detection control signal sent by a further fluid consumption meter or a sensor device acting as an external device.

5. The fluid consumption meter according to claim 1, wherein the control device is configured to send out a leak detection control signal that is able to set an external device into a leak detection mode.

6. The fluid consumption meter according to claim 1, wherein the control device is configured such that the fluid consumption meter is put into said leak detection mode upon receiving the leak detection control signal together with an address identifying said fluid consumption meter.

7. The fluid consumption meter according to claim 1, wherein the data transmitted in the leak detection mode comprise data based on noise recorded by said noise detection module.

8. The fluid consumption meter according to claim 1, wherein the data transmitted in the leak detection mode comprise real time data based on the noise currently recorded by said noise detection module.

9. The fluid consumption meter according to claim 1, wherein the control device and the noise detection module are configured such that data based on the noise recorded by said noise detection module are stored and such that the stored data are transmitted at a different point in time.

10. The fluid consumption meter according to claim 1, wherein the noise detection module and the control device are configured such that a state noise measurement and a baseline noise measurement are performed and that the measured data or data calculated on basis of these measurements are recorded and/or transmitted.

11. The fluid consumption meter according to claim 1, wherein said control device includes a communication unit configured such that different communication protocols and/or data types are selectable for the data to be transmitted.

12. The fluid consumption meter according to claim 1, wherein said control device comprises a counter and is configured such that the counter tracks periods of increased power consumption in the leak detection mode.

13. A leak detection system for leak detection in a fluid supply system, the leak detection system comprising:
   one or more fluid consumption meters for a utility water distribution system, each of the one or more fluid consumption meters comprising:
   a noise detection module for leak detection;
   a control device comprising a bi-directional communication unit and being configured to receive a leak detection control signal from an external device, to set the fluid consumption meter into a leak detection mode upon reception of the leak detection control signal, and to start a noise detection for leak detection in said leak detection mode and to transmit data from said noise detection module; and
   at least one battery for energy supply, wherein one of:
   said control device is configured such that the control device rejects a desired change into the leak detection mode if one of:
      a power consumption violates a desired lifetime of the battery calculated by an algorithm inside the control device;
      a predetermined maximum time of an increased power consumption in the leak detection mode is reached; and
      a limit for the number of activations of the leak detection mode preset in the control device has been reached; and
   said control device is configured such that the control device terminates the leak detection mode if one of:
      a predetermined maximum time of an increased power consumption in the leak detection mode is reached; and
      a power consumption violates a desired lifetime of said battery by an algorithm inside the control device; and
   a remote control having a communication device configured for communication with the communication unit of the one or more fluid consumption meters, wherein the remote control is configured to send out a leak detection control signal to said one or more fluid consumption meters and to receive the data transmitted by the one or more fluid consumption meters.

14. The leak detection system according to claim 13, further comprising: at least one leak detection sensor that is independent from the one or more fluid consumption meter, the leak detection sensor having a communication unit configured to transmit data to the remote control.

15. The leak detection system according to claim 14, wherein the leak detection sensor is configured to receive a leak detection control signal from an external device via said communication unit, and to transmit data in response to this leak detection control signal.

16. The leak detection system according to claim 14, wherein said leak detection sensor comprises a noise detection means.

17. The leak detection system according to claim 14, wherein that the remote control is configured such that the remote control sets several fluid consumption meters into the leak detection mode thereof, at the same time and receives data transmitted by the fluid consumption meters and/or transmitted by leak detection sensors.

18. The leak detection system according to claim 14, wherein that said remote control comprises a display and is configured such that said remote control shows available fluid consumption meters and/or leak detection sensors on the display, and allows a user selection of one or more fluid consumption meters to be set into leak detection mode and/or leak detection sensor to transmit data.

19. The leak detection system according to claim 14, wherein the remote control is configured such that the remote control initiates a data analysis of the data transmitted by the fluid consumption meters and/or the leak detection sensors for leak detection.

20. The leak detection system according to claim 14, wherein the remote control is configured such that the remote control receives the data transmitted from the fluid consumption meters and/or the leak detection sensors either directly or indirectly via a data network and/or via a computing device.

21. The leak detection system according to claim 14, wherein the one or more fluid consumption meters and/or leak detection sensors are configured such that they perform a state noise measurement and a baseline noise measurement and record and/or transmit measured data or data calculated on basis of these measured data to said remote control, preferably in said leak detection mode.

22. The leak detection system according to claim 21, further comprising: at least one valve arranged between a pipe sub-system and a further part of the fluid supply system, wherein the at least one fluid consumption meter and/or the at least one leak detection sensor is arranged inside the pipe sub-system, the fluid consumption meter and/or the leak detection sensor being configured to perform a baseline noise measurement with the valve closed and perform a state noise measurement with the valve at least partly opened.

23. The leak detection system according to claim 13, wherein the remote control is a software application configured to be installed or running on a smartphone or mobile computer.

24. The leak detection system according to claim 13, wherein the remote control is integrated into the fluid consumption meter or a central control device.

25. The leak detection system according to claim 13, wherein the control device comprises a counter, the counter being configured to determine periods of increased power consumption in the leak detection mode, the control device being configured to terminate the leak detection mode when a number of periods of increased power consumption in the leak detection mode reaches a predefined number of periods of increased power consumption, wherein the control device is configured to set the fluid consumption meter into a leak detection mode only when the control device receives the leak detection control signal as input.

* * * * *